Figure 1:
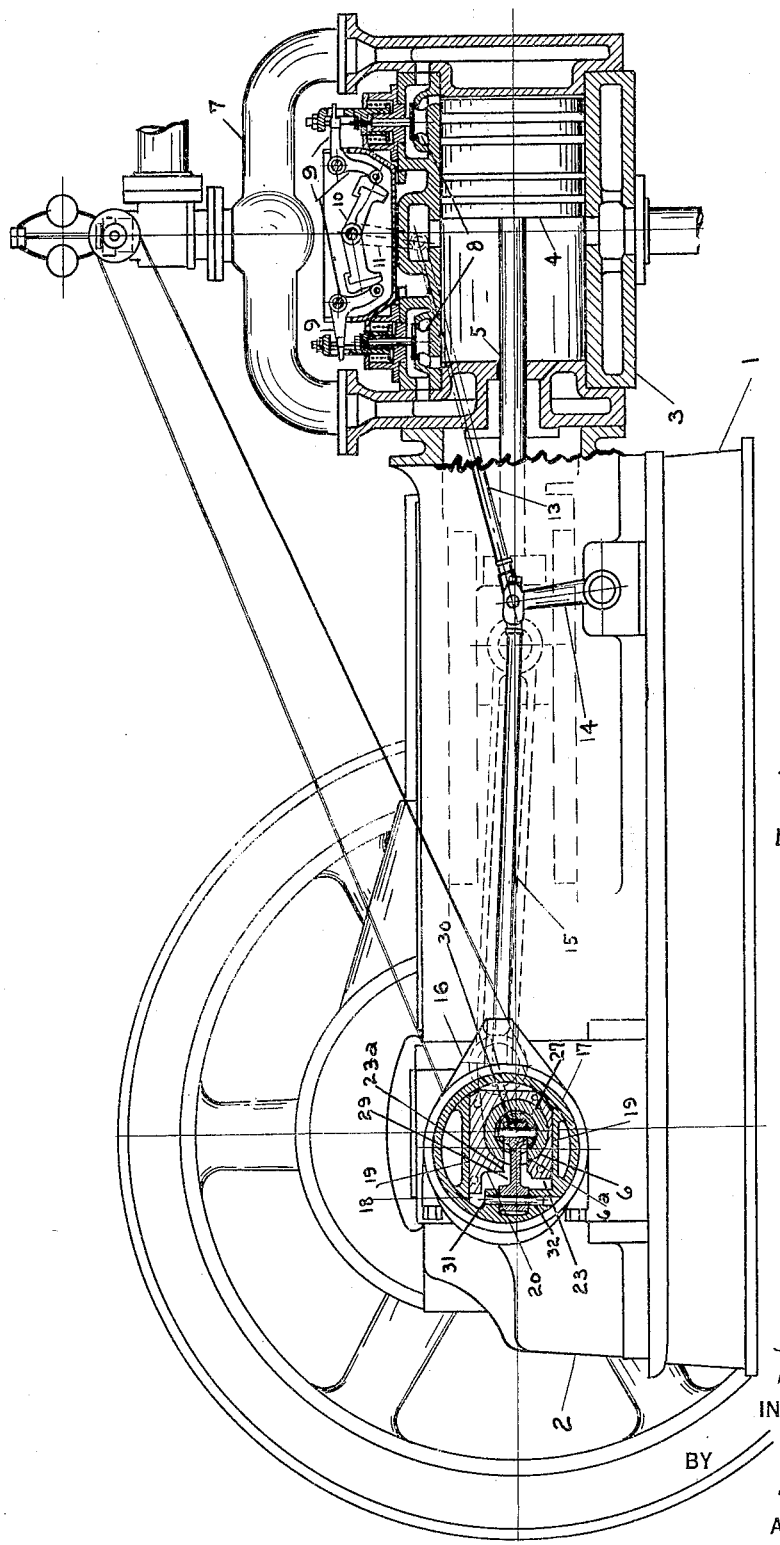

June 28, 1932. W. B. GORR 1,865,247
VALVE GEAR
Filed July 12, 1929 2 Sheets-Sheet 1

Walter B. Gorr
INVENTOR
BY
W. R. Lord
ATTORNEY

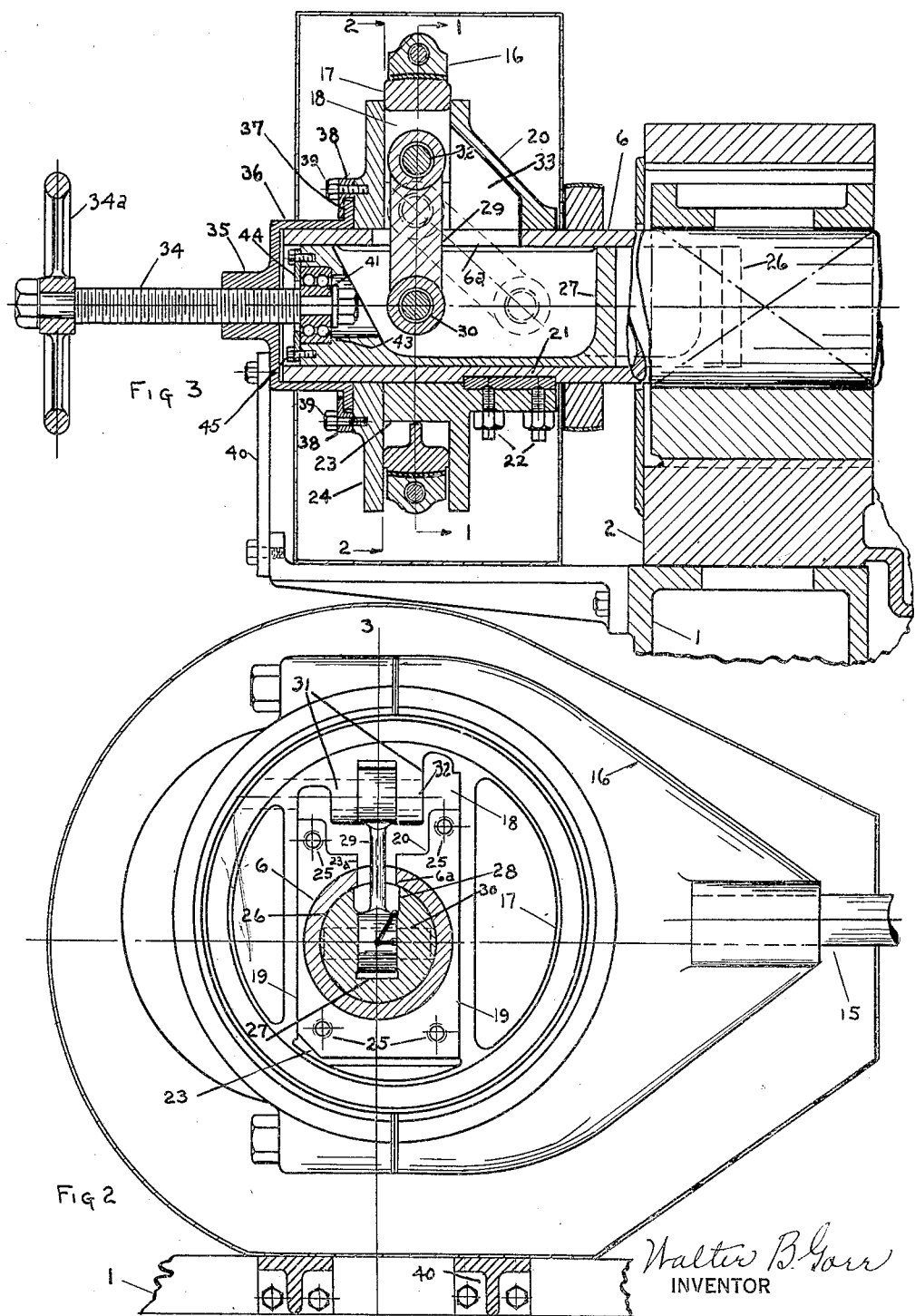

Patented June 28, 1932

1,865,247

UNITED STATES PATENT OFFICE

WALTER B. GORR, OF ERIE, PENNSYLVANIA, ASSIGNOR TO SKINNER ENGINE COMPANY, OF ERIE, PENNSYLVANIA, A CORPORATION OF PENNSYLVANIA

VALVE GEAR

Application filed July 12, 1929. Serial No. 377,660.

The present invention is designed to simplify valve gears for engines, particularly steam engines. Features and details of the invention will appear from the specification and claims.

A preferred embodiment of the invention is illustrated in the accompanying drawings as follows:—

Fig. 1 shows a side elevation of an engine, the cylinder being in section and the eccentric in section on the line 1—1 in Fig. 3.

Fig. 2 a section on the line 2—2 in Fig. 3.

Fig. 3 a section on the line 3—3 in Fig. 2.

1 marks the engine base, 2 the frame, 3 the engine cylinder carried by the frame, 4 a piston operating in the cylinder, 5 the piston rod, 6 the crank shaft on which the piston rod is connected by the usual mechanism, 7 the steam inlet, 8 the steam inlet valves, 9 bell cranks operating the steam engine valves, 10 a rocker operating the bell cranks, 11 a rock arm operating the rocker 10, 13 a link connecting the rock arm 11 with a rock arm 14, 15 an eccentric rod extending from the rocker 14 to the eccentric strap 16, and 17 the eccentric. The eccentric has a slot 18 extending through it, this slot extending crosswise of the eccentric and being slightly off-center so as to take care of the lead of the engine as the eccentric is thrown. The side walls of the slot form guide ribs, or surfaces 19. An eccentric carrier 20 is mounted on the shaft and locked thereon by a key 21, the key being set by screws 22 on the carrier. A guide block 23 projects from the carrier 20 through the slot 18, the sides of this block forming a sliding fit with the guide walls 19. This block is slightly shorter than the slot so that the eccentric has the necessary movement to change the cut-off, or reverse the engine. A cover plate 24 is secured to the block 23 by screws (not shown), the screw-receiving holes in the block being indicated at 25 in Fig. 2. This cover plate opposes the face of the carrier and is so spaced from the face of the carrier 20 as to provide a sliding fit for the eccentric.

The shaft 6 has a bore 26 extending inwardly from the end of the shaft. An actuator 27 is slidingly mounted in this bore. This actuator has a slot 28 opening through one side of the block. A link 29 is pivotally connected with the actuator by a pin 30. It extends through a slot 6a in the shaft, a slot 23a in the block 23, and is pivoted between ears 31 in the wall of the eccentric at the end of the slot 18 by means of a pin 32.

It will readily be seen that as the actuator 27 is moved axially in the bore the link is brought to a true radial position, as shown in Fig. 3, or is more or less inclined to this position and converts the axial movement of the actuator into a radial movement of the eccentric. Thus the eccentric may be thrown back and forth across the axis of the shaft so as to change the cut-off, or to reverse the engine.

The carrier is provided with a housed opening 33 to permit of this endwise movement of the link.

A screw 34 is provided with a hand wheel 34a. The screw operates in a nut 35. The nut is carried by a sleeve 36 and the sleeve is mounted on the end of the shaft 6. The sleeve has a flange 37 which is locked against the cover plate 24 by a plate 38, the plate 38 being secured to the cover plate by screws 39. The nut is locked against turning by a bar 40 secured to the nut and to the engine base. The inner end of the screw is secured to an inner member 41 of a ball bearing. The outer member of this bearing is arranged in a socket 43 and clamped in place by a plate 44 secured on the end of the actuator by screws 45. It will readily be seen that by operating the screw the actuator may be adjusted in and out and with this adjustment of the actuator the eccentric may be adjusted to vary the cut-off, or to reverse the engine.

What I claim as new is:—

1. In a valve gear, the combination of a carrier having a guide block and side guide plate; an eccentric having a slot into which the guide block extends, the walls of the slot forming guides slidingly mounting the eccentric on the carrier; a cover plate secured to the block and acting as a side guide opposite the carrier guide plate; an actuator movable axially relatively to the carrier; and a link between the actuator and the eccentric converting axial movement of the actuator to radial movement of the eccentric.

2. In a valve gear, the combination of a carrier having a guide block and a side guide plate; an eccentric having a slot into which the guide block extends, the walls of the slot forming guides slidingly mounting the eccentric on the carrier; an actuator movable axially relatively to the carrier; and a link between the actuator and the eccentric converting axial movement of the actuator to radial movement of the eccentric, said carrier having an off-set housing accommodating the endwise movement of the link.

3. In a valve gear, the combination of an eccentric-carrying shaft having a bore, said shaft having a slot through the wall thereof leading into the bore; and actuator axially movable in the bore; an eccentric mounted on the shaft and movable crosswise of the axis of the shaft; and a link operating through the slot and connecting the actuator and the eccentric and converting an axial movement of the actuator to radial movement of the eccentric.

4. In a valve gear, the combination of an eccentric-carrying shaft having a bore, said shaft having a slot through the wall thereof leading into the bore; an actuator axially movable in the bore; a nut concentric with the shaft; a screw in the nut operating the actuator; an eccentric mounted on the shaft and movable crosswise of the shaft; and a link operating through the slot and connecting the actuator and the eccentric and converting an axial movement of the actuator to radial movement of the eccentric.

5. In a valve gear, the combination of a shaft having a bore and a slot through the side thereof; a carrier mounted on the shaft; a guide block extending from the carrier; an eccentric slidingly mounted on the guide block, an actuator in the bore and axially movable therein; a link operating through the slot and connecting the actuator and the eccentric and converting an axial movement of the actuator to radial movement of the eccentric; and means moving the actuator.

In testimony whereof I have hereunto set my hand.

WALTER B. GORR.